US 9,746,883 B2

(12) United States Patent
Lee et al.

(10) Patent No.: US 9,746,883 B2
(45) Date of Patent: Aug. 29, 2017

(54) PORTABLE DEVICE AND METHOD OF CONTROLLING THEREFOR

(71) Applicant: LG ELECTRONICS INC., Seoul (KR)

(72) Inventors: Doyoung Lee, Seoul (KR); Sinae Chun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 53 days.

(21) Appl. No.: 14/562,160

(22) Filed: Dec. 5, 2014

(65) Prior Publication Data
US 2016/0098063 A1 Apr. 7, 2016

(30) Foreign Application Priority Data
Oct. 6, 2014 (KR) .................... 10-2014-0134428

(51) Int. Cl.
G09G 5/00 (2006.01)
G06F 1/16 (2006.01)
G09G 5/38 (2006.01)
G06F 3/14 (2006.01)

(52) U.S. Cl.
CPC .......... *G06F 1/1641* (2013.01); *G06F 1/1649* (2013.01); *G06F 1/1662* (2013.01); *G06F 3/1431* (2013.01); *G06F 3/1438* (2013.01); *G09G 5/38* (2013.01); *G06F 2203/04102* (2013.01); *G09G 2340/045* (2013.01); *G09G 2340/0442* (2013.01); *G09G 2340/0492* (2013.01); *G09G 2340/14* (2013.01)

(58) Field of Classification Search
CPC .............. G09G 2340/0492; G06F 2200/1614
USPC ........................................ 345/659
See application file for complete search history.

(56) References Cited

U.S. PATENT DOCUMENTS

| 7,443,179 B2 | 10/2008 | Kosmowski | |
| 2008/0062625 A1* | 3/2008 | Batio | G06F 1/1615 361/679.29 |
| 2010/0064244 A1 | 3/2010 | Kilpatrick, II et al. | |
| 2010/0182265 A1 | 7/2010 | Kim et al. | |
| 2011/0006971 A1* | 1/2011 | Ebey | G06F 1/1616 345/1.3 |
| 2012/0081271 A1* | 4/2012 | Gimpl | G06F 1/1616 345/1.3 |

(Continued)

FOREIGN PATENT DOCUMENTS

KR 10-2012-0092036 A 8/2012
WO WO 2013/154275 A1 10/2013

*Primary Examiner* — Jin Ge
(74) *Attorney, Agent, or Firm* — Birch, Stewart, Kolasch & Birch, LLP

(57) ABSTRACT

The method of a portable device may includes the steps of setting a first mode based on a first folding angle between the first body and the second body and a second folding angle between the first body and the third body, displaying a first application in the first mode, detecting change of the first folding angle and change of the second folding angle in the first mode, detecting the changed first folding angle being equal to or greater than a first threshold angle and the changed second folding angle less than a second threshold angle and if it is detected that a rear side of the second body is in a state of being contacted with a different real object, switching the first mode to a second mode.

18 Claims, 16 Drawing Sheets

(56) References Cited

U.S. PATENT DOCUMENTS

| | | | |
|---|---|---|---|
| 2012/0081277 A1* | 4/2012 | de Paz | G06F 1/1616 345/156 |
| 2012/0127061 A1* | 5/2012 | Pegg | H04M 1/0247 345/1.1 |
| 2013/0229324 A1* | 9/2013 | Zhang | G09G 5/00 345/1.3 |
| 2013/0250492 A1* | 9/2013 | Wong | G06F 1/1641 361/679.01 |
| 2013/0271389 A1* | 10/2013 | Lyons | G04G 17/083 345/173 |
| 2013/0321340 A1* | 12/2013 | Seo | G06F 1/1641 345/174 |
| 2014/0210737 A1 | 7/2014 | Hwang et al. | |
| 2014/0285450 A1 | 9/2014 | Cho et al. | |
| 2015/0116364 A1* | 4/2015 | Aurongzeb | G06F 3/0487 345/659 |

\* cited by examiner

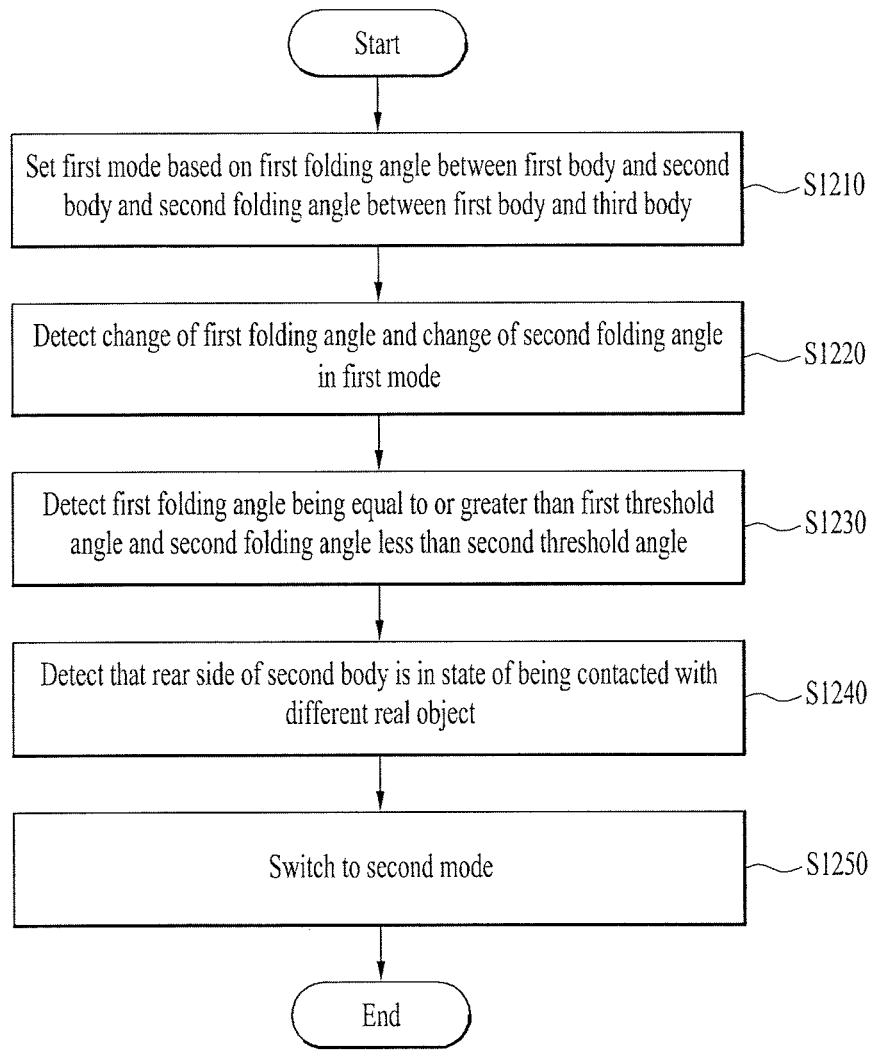

PORTABLE DEVICE AND METHOD OF CONTROLLING THEREFOR

This application claims the benefit of the Korean Patent Application No. 10-2014-0134428, filed on Oct. 6, 2014, which is hereby incorporated by reference as if fully set forth herein.

BACKGROUND OF THE INVENTION

Field of the Invention

The present specification relates to a portable device and a method of controlling therefor.

Discussion of the Related Art

A use of a portable device using a flexible display is increasing. In this case, the portable device using the flexible display may provide a user with a wide screen. At the same time, the portable device using the flexible display may have a foldable structure. In doing so, mobility of the portable device may increase. Recently, it is proposed to make the portable device to include three bodies and have a structure capable of folding the three bodies by folding. In this case, the portable device may operate in a state that all bodies are folded. And, the portable device may operate in a state that all bodies are unfolded. In this case, an operation method of the portable device may be differently configured according to a folded state of the bodies. Hence, it is required to have a method of controlling the operation method.

SUMMARY OF THE INVENTION

Accordingly, the present specification is directed to an apparatus and method thereof that substantially obviate one or more problems due to limitations and disadvantages of the related art.

An object of the present specification is to provide a portable device and a method of controlling therefor.

Another object of the present specification is to provide a portable device of a structure including a first body at the center of the portable device, a second body situating at one side of the first body and a third body situating at another side of the first body.

Another object of the present specification is to provide a method of setting an operation mode of a portable device based on a folding angle between a first body and a second body and a folding angle between the first body and a third body.

Another object of the present specification is to provide a method of displaying an application based on an operation mode of a portable device.

The other object of the present specification is to control a method of detecting a change of a folding angle in each operation mode and a method of displaying an application based on the changed folding angle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

A portable device may be provided according to one embodiment. In this case, the portable device may include a first body at the center of the portable device, a second body positioned at one side of the first body and a third body positioned at another side of the first body. And, the portable device may include a display unit configured to display visual information on at least one selected from the group consisting of a first area of the first body, a second area of the second body and a third area of the third body, a first sensor unit configured to detect at least one of a first folding angle between the first body and the second body and a second folding angle between the first body and the third body, a second sensor unit configured to detect a state that a rear side of the second body is contacted with a different real object and a processor configured to control the display unit, the first sensor unit and the second sensor unit. In this case, the processor is configured to set a first mode based on the first folding angle and the second folding angle, display a first application in the first mode, detect change of the first folding angle and change of the second folding angle in the first mode, if it is detected that the changed first folding angle is being equal to or greater than a first threshold angle, the changed second angle is less than a second threshold angle and the rear side of the second body is in the state of being contacted with the different real object, switch the first mode to a second mode. The second mode corresponds to a mode configured to display the first application on the first area and display a second application related to a first object contained in the first application on the second area.

A method of controlling a portable device according to one embodiment of the present specification includes the steps of setting a first mode based on a first folding angle between the first body and the second body and a second folding angle between the first body and the third body, displaying a first application in the first mode, detecting change of the first folding angle and change of the second folding angle in the first mode, detecting the changed first folding angle being equal to or greater than a first threshold angle and the changed second folding angle less than a second threshold angle and if it is detected that a rear side of the second body is in a state of being contacted with a different real object, switching the first mode to a second mode. In this case, the second mode may correspond to a mode configured to display the first application on the first area and display a second application related to a first object included in the first application on the second area.

According to the present specification, it is able to provide a portable device and a method of controlling therefor.

According to the present specification, it is able to provide a portable device of a structure including a first body at the center of the portable device, a second body situating at one side of the first body and a third body situating at another side of the first body.

According to the present specification, a portable device may set an operation mode based on a folding angle between a first body and a second body and a folding angle between the first body and a third body.

According to the present specification, a portable device may display an application based on an operation mode.

According to the present specification, a portable device may detect a change of a folding angle in each operation mode and control a method of displaying an application based on the changed folding angle.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 12 is a flowchart for a method of controlling a portable device according to one embodiment of the present specification.

DETAILED DESCRIPTION OF THE INVENTION

While embodiments have been described in detail with reference to the attached drawings and contents written on the drawings, the scope of claims may be non-restricted or non-limited by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, a terminology, each of which includes such an ordinal number as first, second and the like, may be used to describe various components. In doing so, the various components should be non-limited by the corresponding terminologies, respectively. The terminologies are only used for the purpose of discriminating one component from other components. For instance, a first component may be named a second component while coming within the scope of the appended claims and their equivalents. Similarly, the second component may be named the first component.

In the present application, such a terminology as 'comprise', 'include' and the like should be construed not as necessarily excluding various components or steps written in the present specification but as including the components or steps in part or further including additional components or steps. And, such a terminology as 'unit' written in the present specification indicates a unit processing at least one function or an operation and may be implemented by hardware, software or a combination thereof.

Figure 1:
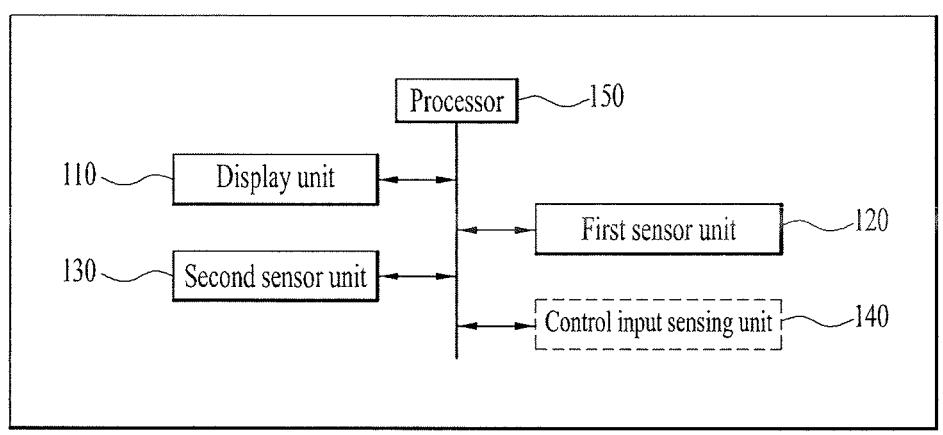
FIG. 1 is a block diagram for a portable device according to one embodiment of the present specification.

FIG. 1 is a block diagram for a portable device according to one embodiment of the present specification.

A portable device 100 may correspond to a device including a first body, a second body and a third body. In particular, the portable device may correspond to a device including a first body at the center of the device, a second body situating at one side of the first body and a third body situating at another side of the first body. In this case, as an example, the portable device may have the second body on the left of the first body at the center of the portable device. And, the portable device 100 may include the third body on the right of the first body. In this case, as an example, the second body located at the left of the first body may be folded to the first body. And, the third body located at the right of the first body may be folded to the first body. And, the second body may be located at the right of the first body and the third body may be located at the left of the first body. In particular, the portable device 100 may have a device structure including 3 bodies capable of being folded, by which the present specification may be non-limited. And, as an example, the portable device may correspond to a flexible device. As an example, the aforementioned first body, the second body and the third body may correspond to a single integrated structure. In this case, the portable device may distinguish the first body, the second body and the third body from each other based on whether the flexible structure is folded. More specifically, the flexible device corresponds to a bendable material and may be folded. In this case, as an example, if the flexible device is folded twice based on two folding lines, the flexible device may be divided into 3 areas. In this case, the 3 areas may correspond to the aforementioned first body, the second body and the third body, respectively. In particular, the portable device 100 may correspond to a structure capable of being divided into 3 areas based on 2 folding lines, by which the present specification may be non-limited.

The portable device 100 may include a display unit 110, a first sensor unit 120, a second sensor unit 130 and a processor 150. The portable device 100 may further include a control input sensing unit 140 as an optional configuration. In this case, as an example, each of the units may correspond to a configuration element or a part constructing the portable device 100. In particular, each of the units may correspond to an independent unit housed in the portable device to make the portable device 100 implement a function, by which the present specification may be non-limited.

The display unit 110 may be controlled by the processor 150. In this case, the display unit 110 may display an image on at least one area selected from the group consisting of a first area of the first body, a second area of the second body and a third area of the third body. In this case, as an example, the first body includes a first display unit and may display an image on the first area using the first display unit. And, the second body includes a second display unit and may display an image on the second area using the second display unit. And, the third body includes a third display unit and may display an image on the third area using the third display unit. In particular, a display unit is separately included in each body and may display an image on an area included in each body. And, as an example, the display unit 110 may display images on the first area, the second area and the third area, respectively, as an integrated unit. As an example, if the portable device 100 corresponds to a flexible display device, the display unit 110 may correspond to an integrated structure. In this case, the display unit 100 may display images on the first area, the second area and the third area, respectively, based on folding of the flexible display device. In particular, the display unit 110 may correspond to a unit capable of displaying images on the first area of the first body, the second area of the second body and the third area of the third body, by which the present specification may be non-limited.

And, as an example, the display unit 110 may display images on a front side area and a rear side area of the first body, the second body and the third body. More specifically, the aforementioned first area may be set to a front side or a rear side of the first body. And, the first area may be set to both the front side and the rear side of the first body. In particular, the portable device 100 may display an image on at least one or more areas of the front side or the rear side of each body, by which the present specification may be non-limited.

The portable device 100 may include a first sensor unit 120. In this case, as an example, the first sensor unit 120 may correspond to a sensor unit configured to detect a folded state of the second body and a folded state of the third body. More specifically, the first sensor unit 120 may correspond to a sensor unit configured to detect whether the second body and the third body are folded to the first body. In this case, the first sensor unit 120 may detect a first folding angle between the first body and the second body. And, the first sensor unit 120 may detect a second folding angle between the first body and the third body. In this case, as an example, the first sensor unit 120 measures an angle formed by an internal angle between the first body and the second body or an angle formed by an internal angle between the first body and the third body and may be then able to sense whether the portable device is in an unfolded state or a folded state. As a different embodiment, the first sensor unit 120 may sense whether each of the bodies is folded based on a distance of each body or an operation state of a hinge. And, the first sensor unit 120 may deliver detected folding information to the processor 150. In particular, the first sensor unit 120 may correspond to a sensor unit capable of detecting a folded state of the first body and the second body and a folded state of the first body and the third body, by which the present specification may be non-limited.

A second sensor unit 130 may correspond to a sensor configured to detect a state that a rear side of each body is contacted with a different real object. In this case, the real object may correspond to a hand of a user, a desk or the like. In particular, the second sensor unit may correspond to a sensor unit configured to detect whether a rear side of each body is in a state of being contacted with a different real object. In this case, as an example, the second sensor unit 130 may detect a state of being contacted with a different real object using a resistive touch sensor or a capacitive touch sensor. As a different example, the second sensor unit 130 may include at least one selected from the group consisting of an infrared sensor, a proximity sensor, an ultrasonic sensor and an illumination sensor. In this case, the second sensor unit 130 may correspond to a sensor configured to measure distance and may be able to detect whether a rear side of each body is in a state of being contacted with a different real object based on distance between the real side of each body and the different real object. In particular, the second sensor unit 130 may correspond to a sensor unit configured to detect whether a real side of each body is in a state of being contacted with a different real object, by which the present specification may be non-limited.

The portable device 100 may further include a control input sensing unit 140 as an optional configuration. In this case, the control input sensing unit 140 may deliver environment recognized by a user input or a device to the processor 150 using at least one or more sensors installed in the portable device 100. More specifically, the control input sensing unit 140 may sense a control input of a user using at least one or more sensors installed in the display device 100. In this case, at least one or more sensing means may include various sensing means such as a touch sensor, a fingerprint sensor, a motion sensor, a proximity sensor, an illumination sensor, a voice recognition sensor, a pressure sensor and the like configured to sense a control input. The control input sensing unit 120 is a common name of the aforementioned various sensing means. The aforementioned sensors may be included in a device as a separate element or may be included in the device in a manner of being integrated into at least one or more elements. In particular, the control input sensing unit 120 may correspond to a unit configured to sense a control input of a user, by which the present specification may be non-limited. And, as an example, the control input may correspond to a gesture input and may correspond to contact or non-contact various inputs. And, the control input may correspond to an input inputted by an input device or an input inputted by voice or audio, by which the present specification may be non-limited. And, as an example, the control input sensing unit 130 may correspond to an element integrated with a display unit 110. As an example, the display unit 110 may correspond to a touch sensitive display unit 110.

The processor 150 may correspond to a unit configured to control at least one selected from the group consisting of the display unit 110, the first sensor unit 120, the second sensor unit 130 and the control input sensing unit 140. More specifically, the processor 150 may detect a folded state of the first body and the second body and a folded state of the first body and the third body using the first sensor unit 120. In this case, as an example, the processor 150 may detect a first folding angle corresponding to an internal angle between the first body and the second body using the first sensor unit 120. And, the processor 150 may detect a second folding angle corresponding to an internal angle between the first body and the third body. In this case, as an example, the processor 150 may set a first mode based on the first folding angle and the second folding angle. In this case, as an example, the processor 150 may execute a first application in the first mode. The first mode may correspond to a state that the first folding angle and the second folding angle are less than a first threshold angle. In this case, the first threshold angle may correspond to a threshold angle determining whether a device is folded and may have a prescribed error range. The first threshold angle is a very small angle and may correspond to an angle configured to detect a folded state. In particular, the first mode may correspond to a mode configured to be set in a state that both the second body and the third body are folded to the first body. As a different embodiment, the first mode may correspond to a state that the first folding angle and the second folding angle are equal to or greater than a second threshold angle. In this case, the second threshold angle may correspond to a threshold angle determining whether a device is unfolded and may have a prescribed error range. In particular, the second threshold angle is a very large angle close to 180 degrees and may correspond to an angle configured to detect an unfolded state. In particular, the first mode may correspond to a mode configured to be set in a state that both the second body and the third body are unfolded. In this case, the processor 150 may detect change of the first folding angle and change of the second folding angle using the first sensor unit 120. And, the processor 150 may detect whether a rear side of each body is in a state of being contacted with a different real object using the second sensor unit 130. In this case, as an example, if the processor 150 detects that the changed first folding angle is equal to or greater than a third threshold angle, the change second folding angle is less than a fourth threshold angle and a rear side of the second body is in a state of being contacted with a different real object, the processor may switch the first mode to a second mode. In this case, the second mode may correspond to a mode displaying a first application on a first area using the display unit 110. And, the second mode may correspond to a mode displaying a second application associated with a first object included in the first application on a second area. Regarding this, it shall be described later with reference to FIG. 3.

The aforementioned elements may be included in the portable device 100 as a separate element or may be included in the portable device in a manner of being integrated into at least one or more elements.

Figure 2:
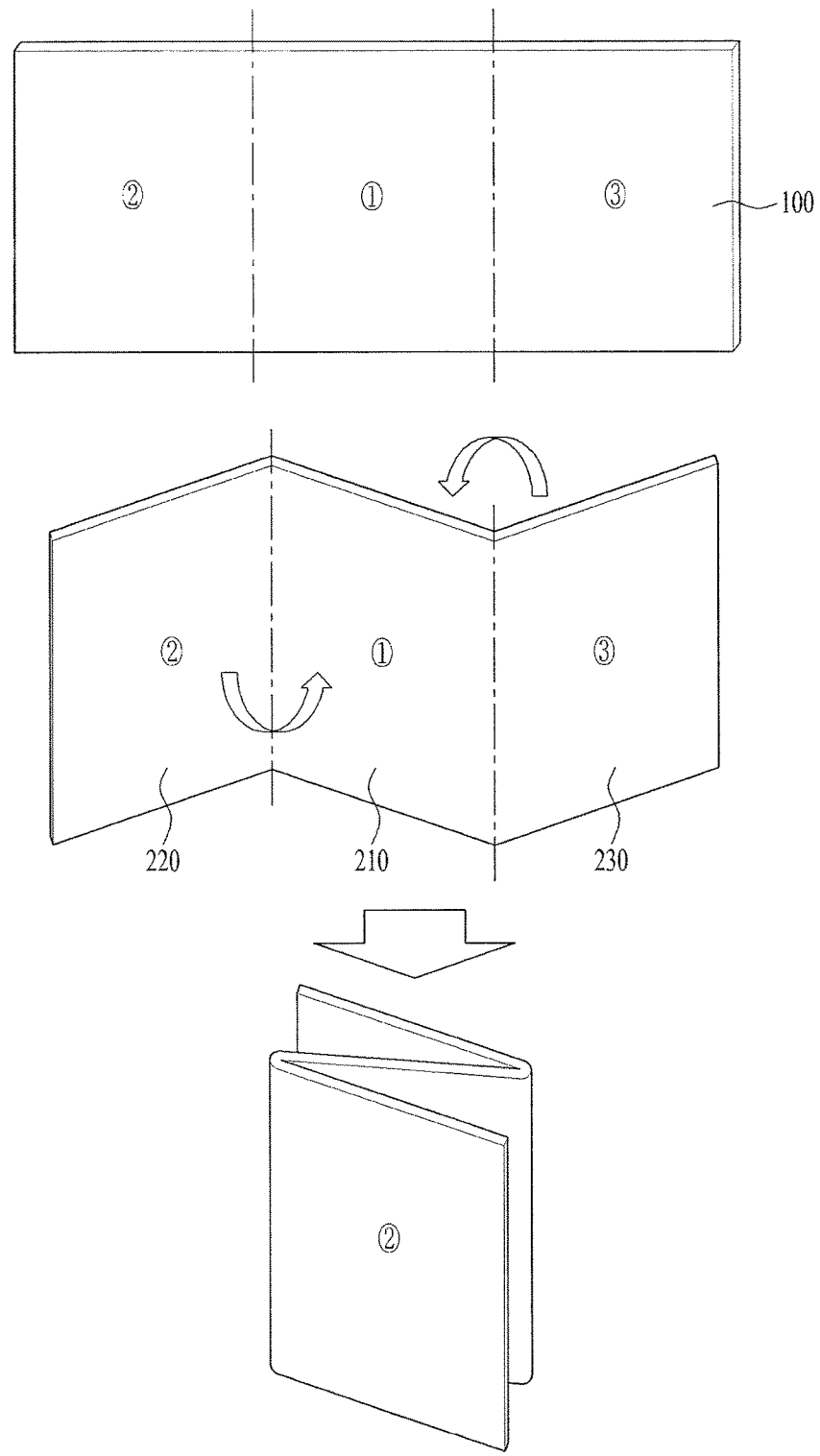
FIG. 2 is a diagram for a method of folding a portable device according to one embodiment of the present specification.

FIG. 2 is a diagram for a method of folding a portable device according to one embodiment of the present specification. As mentioned in the foregoing description, a portable device 100 may include a first body 210, a second body 220 and a third body 230. In this case, the second body 220 may be located at the left of the first body 210. And, the third body 230 may be located at the right of the first body 210.

The portable device 100 may make the first area, the second area and the third area of the display unit 110 to be located at a front side direction of the portable device. In particular, the front direction may correspond to a direction in which an image is displayed in the portable device 100. And, a rear side direction may correspond to a direction in which an image is not displayed in the portable device 100. In particular, in case that a user holds the portable device 100, the front side direction corresponds to a direction facing the user and the rear side direction may correspond to an opposite direction of the front side direction. In this case, as an example, the second body 220 may be folded to the first body 210 to make a front side of the second body 220 and a front side of the first body to be overlapped with each other. And, the third body 230 may be folded to the first body 210 to make a rear side of the third body 230 and a rear side of the first body 210 to be overlapped with each other. In particular, the second body 220 and the third body 230 may be folded to make two sides of the first body 210 to be contacted with the second body 220 and the third body 230, respectively.

As a different example, the second body 220 may be folded to the first body 210 to make a rear side of the second body 220 and the rear side of the first body to be overlapped with each other. And, the third body 230 may be folded to the first body 210 to make a front side of the third body 230 and the front side of the first body 210 to be overlapped with each other. In particular, the second body 220 and the third body 230 may be folded to make two sides of the first body 210 to be contacted with the second body 220 and the third body 230, respectively.

In particular, the portable device 100 including 3 bodies may have various folding structures, by which the present specification may be non-limited.

Figure 3:
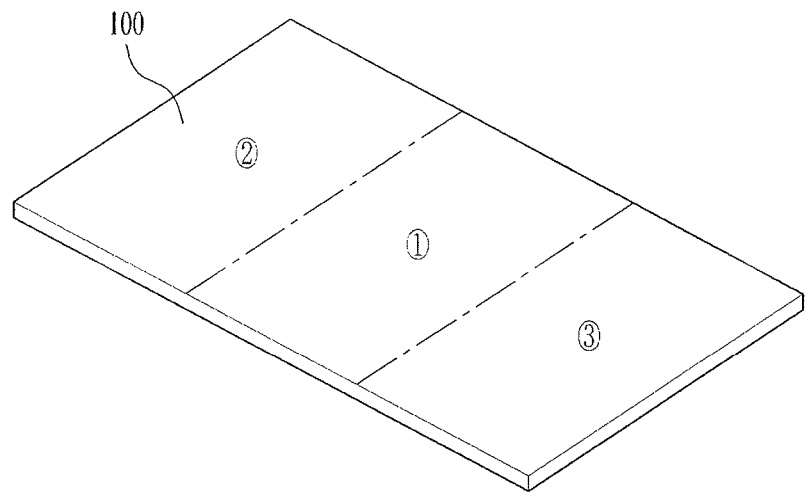
FIG. 3 is a diagram of a method for a portable device to set an operation mode based on a folding angle according to one embodiment of the present specification.
Figure 3:
Figure 3:
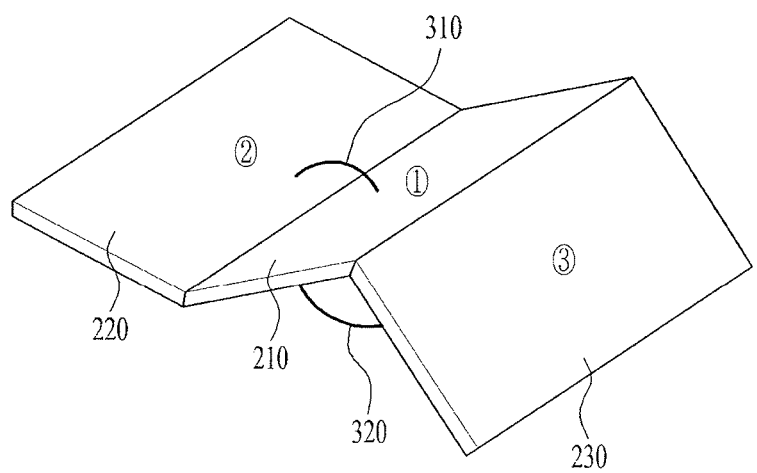

FIG. 3 is a diagram of a method for a portable device to set an operation mode based on a folding angle according to one embodiment of the present specification. In this case, as an example, if both a second body 220 and a third body 230 are in an unfolded state, a portable device 100 may set a first mode. And, as an example, if the both the second body 220 and the third body 230 are in a folded state, the portable device 100 may set the first mode. This is identical to what is mentioned earlier in FIG. 1.

The portable device 100 may detect change of a first folding angle 310 and change of a second folding angle 320 in the first mode. In this case, the portable device 100 may detect a state that the changed first folding angle 310 is equal to or greater than a first threshold angle and the changed second folding angle 320 is less than a second threshold angle. In this case, as an example, the first threshold angle may correspond to an angle between 90 degrees and 180 degrees. And, the second threshold angle may correspond to an angle between 0 degree and 90 degrees. In particular, the first threshold angle and the second threshold angle may correspond to a threshold angle configured to determine a folded state of the first body 210, that of the second body 220 and that of the third body 230. In this case, the portable device 100 may detect a state that the rear side of the second body 220 is contacted with a different real object. In this case, the different real object may correspond to a user, a desk or the like. If the first folding angle 310 is equal to or greater than the first threshold angle, the second folding angle 320 is less than the second threshold angle and the rear side of the second body 220 is in the state of being contacted with the different real object, the portable device 100 may switch the first mode to a second mode. More specifically, referring to FIG. 3, the portable device 100 detects a folded state of the portable device, which is used in a manner of being put on a desk or the like in a prescribed form, and may set the second mode. In this case, as an example, the second mode corresponds to a cradle mode. The cradle mode may correspond to a mode of using the portable device 100 in a manner of putting the portable device on a prescribed location. By doing so, a user may use the portable device 100 including 3 bodies as a notebook or a device of a form of being cradled.

As a further different example, the portable device 100 may set the second mode only when the portable device further detects that a landscape mode is set. More specifically, the portable device may be set by either a portrait mode or the landscape mode. In this case, the portrait mode may correspond to a mode of the portable device of which the portable device 100 is used vertically. And, the landscape mode may correspond to a mode of the portable device of which the portable device 100 is used horizontally. As an example, the portable device 100 detects a direction of the portable device 100 using a sensor unit (not depicted) and may be able to set either the portrait mode or the landscape mode based on the detected direction. In this case, the portable device 100 may be configured to switch to the second mode in the landscape mode only. By doing so, a user may control a method of setting the second mode.

And, as an example, if the first mode is set in a manner that both the second body 220 and the third body 230 are unfolded, the portable device 100 may display a first application on a first area of the first body, a second area of the second body 220 and a third area of the third body 230. In particular, the portable device 100 may display the first application on a whole body. In this case, if the first mode is switched to the second mode, the portable device 100 may display the first application on the first area in a manner of reducing the first application with a predetermined ratio. In particular, the portable device 100 may display the first application on the first area in a manner of reducing the first application in accordance with a size of the first area.

And, as an example, if the first mode is set in a manner that both the second body 220 and the third body 230 are folded, the portable device 100 may display the first application on the second area of the second body 220 or the third area of the third body 230. In this case, if the first mode is switched to the second mode, the portable device 100 may display the first application in a manner of moving the first application to the first area. In particular, the portable device 100 may display the first application on the first area in a same size in a manner of moving the first application to the first area.

Figure 4A:
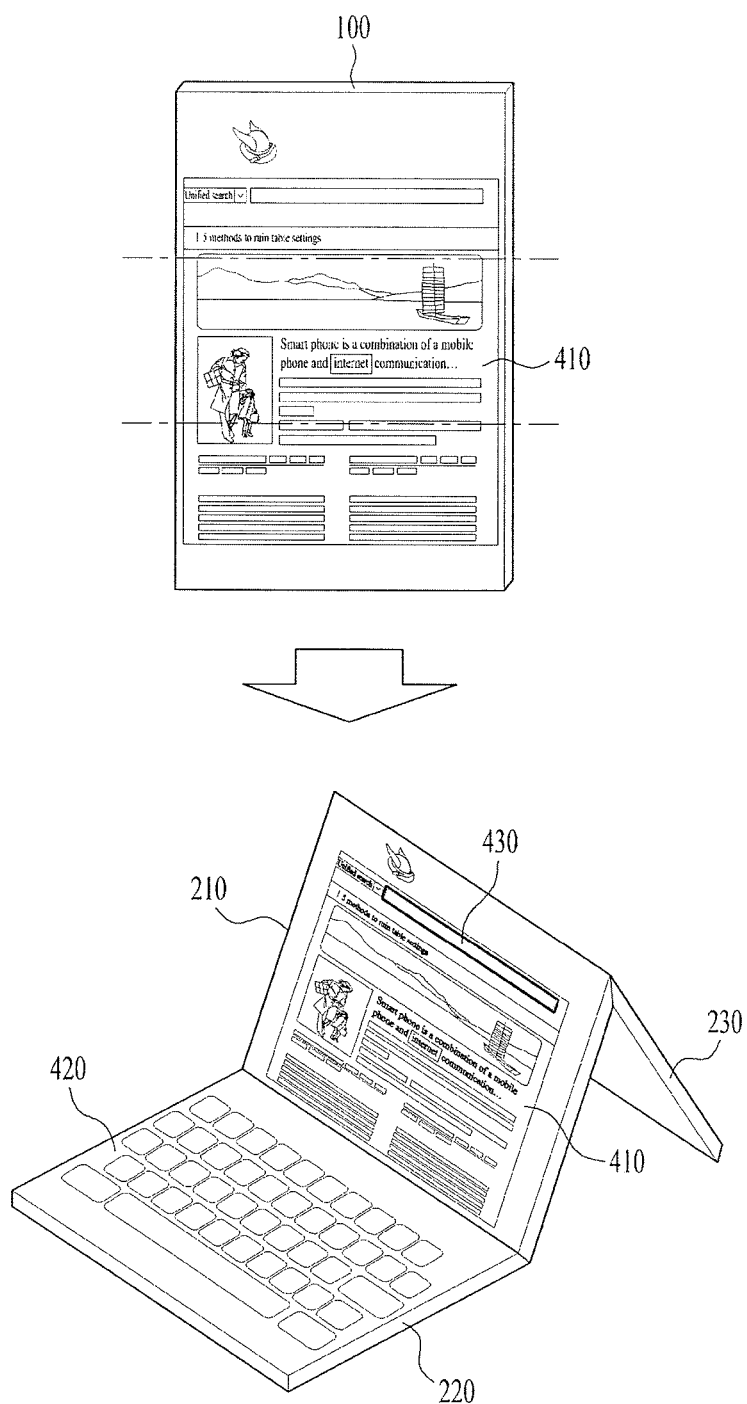
FIGS. 4A and 4B are diagrams of a method for a portable device to display a second application for an object included in a first application in a second mode according to one embodiment of the present specification.
Figure 4B:
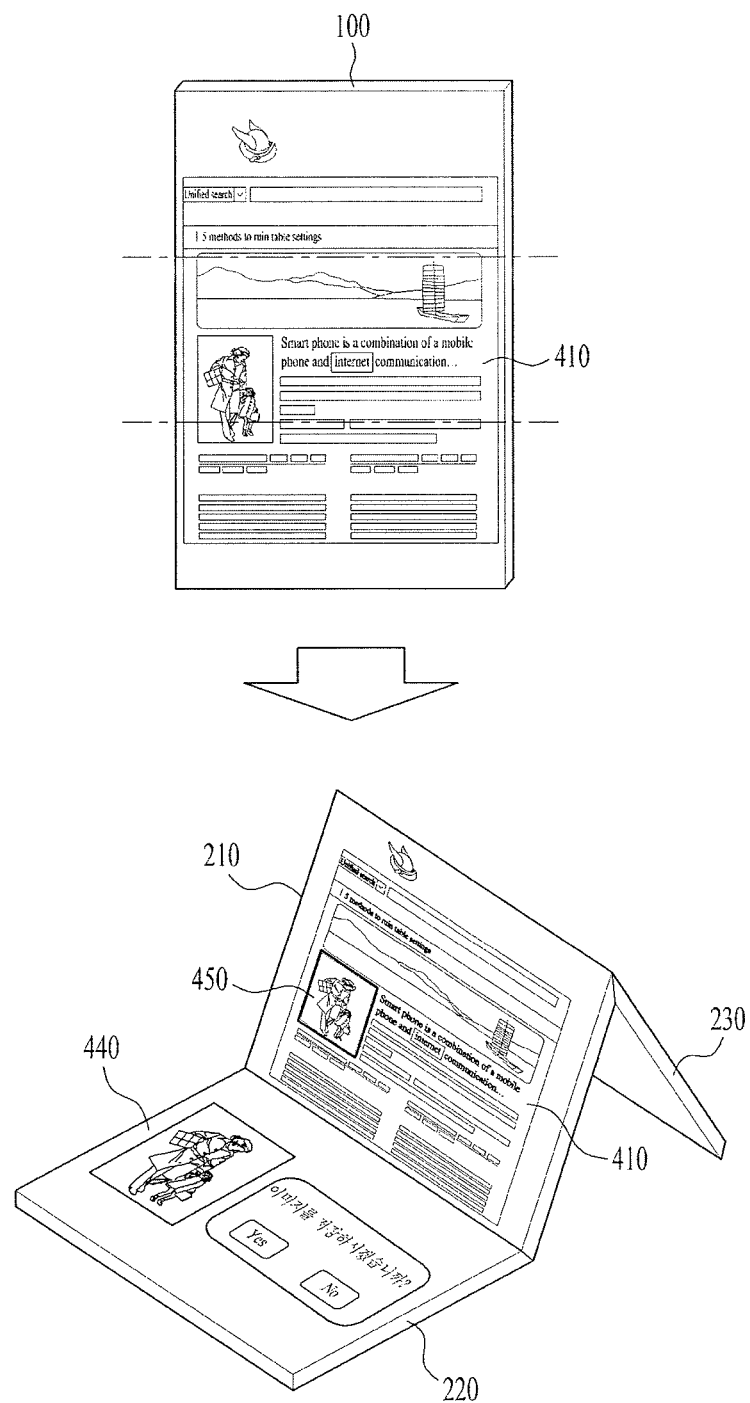

FIGS. 4A and 4B are diagrams of a method for a portable device to display a second application for an object included in a first application in a second mode according to one embodiment of the present specification. A portable device 100 may execute a first application 410 in a first mode. In this case, as an example, the first application 410 may correspond to an internet application. In this case, the portable device may detect that the first mode is switched to a second mode. If the first mode is switched to the second mode, the portable device 100 may display the first application 410, which is used to be executed in the first mode, on a first area of a first body 210. And, the portable device 100 may display a second application 420 associated with the first application 410 on a second area of a second body 220. In this case, as an example, the second application 420 may correspond to an application related to a first object 430 included in the first application 410. In this case, the first object 430 may correspond to an image, a text, an icon and the like included in the first application 410. And, the first object 430 may correspond to an area configured by a user or a processor 150.

As an example, referring to FIG. 4A, the first application 410 may correspond to an internet application. And, the first object 430 may correspond to a search window 430 included in the internet application. In this case, the second application 420 may correspond to a virtual keyboard application as an application related to the search window 430. In particular, if a user switches the first mode to the second mode, the portable device 100 may display a keyboard application 420 related to the search window 430 of the internet application 410 on the second area.

As a different example, referring to FIG. 4B, the first application 410 may include a second object 450. In this case, as an example, the second object 450 may correspond to an image. In this case, if the first mode is switched to the second mode, the portable device 100 may display a third application 440 related to the second object 450 on the second area. In this case, the third application 440 may correspond to an application used for determining whether to store an image. In particular, the portable device 100 may display an application related to a specific object among objects included in the first application 410 on the second area.

In this case, as an example, the portable device 100 may display the first application 410 in the first mode. In this case, the portable device 100 may detect a first control input selecting a first object 430 included in the first application 410 in the first mode. Subsequently, if the first mode is switched to the second mode, the portable device 100 may display a second application 420 related to the first object on the second area.

And, the portable device 100 may detect a second control input selecting a second object 450 in the first mode. Subsequently, if the first mode is switched to the second mode, the portable device 100 may display a third application 440 related to the second object 450 on the second area. In particular, the portable device 100 may display an application related to a selected object.

As a different example, in case that the portable device 100 displays the second application 420 on the second area in the second mode, the portable device 100 may detect a third control input selecting the second object 450. In this case, the portable device 100 may display the third application 440 on the second area based on the third control input. In particular, the portable device 100 may change an application displayed on the second area based on a control input in the second mode.

Figure 5A:
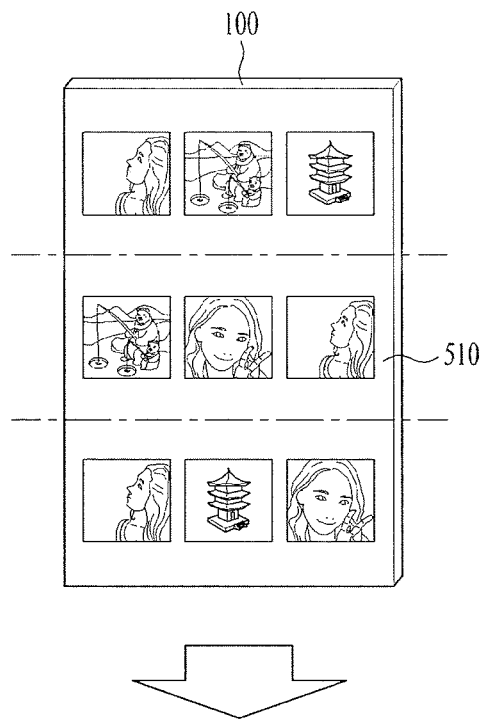
FIGS. 5A and 5B are diagrams of a method for a portable device to control an application based on a control input in a second mode according to one embodiment of the present specification.
Figure 5A:
Figure 5A:
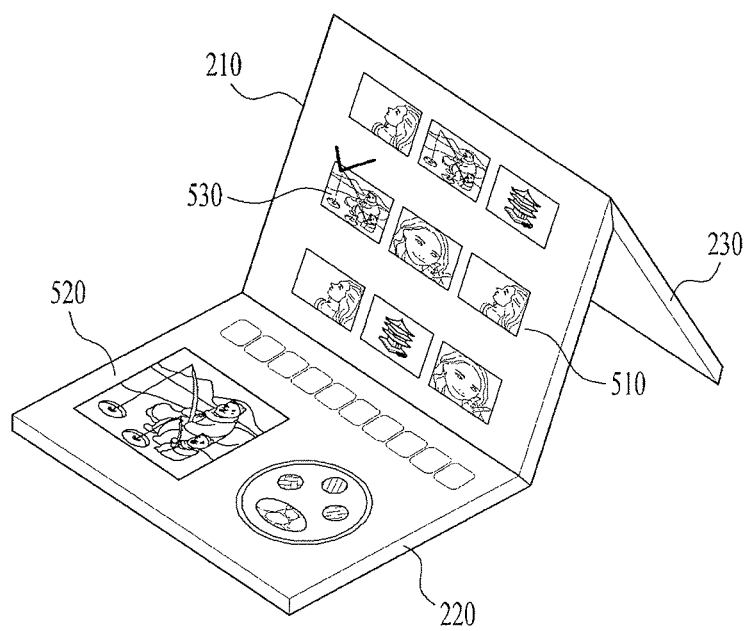
Figure 5B:
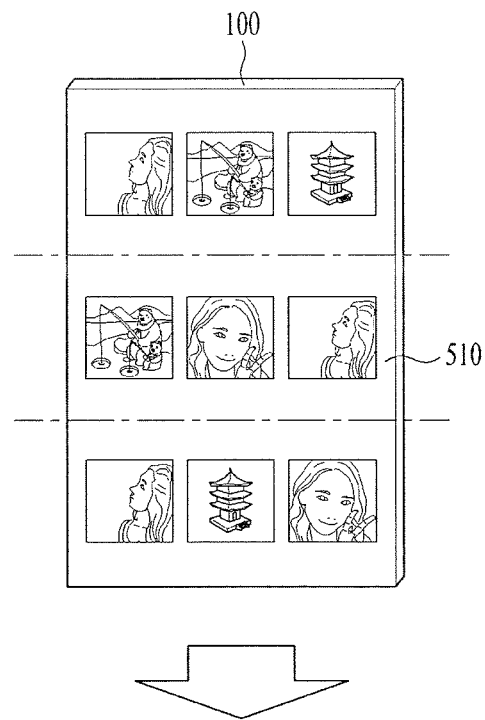
Figure 5B:
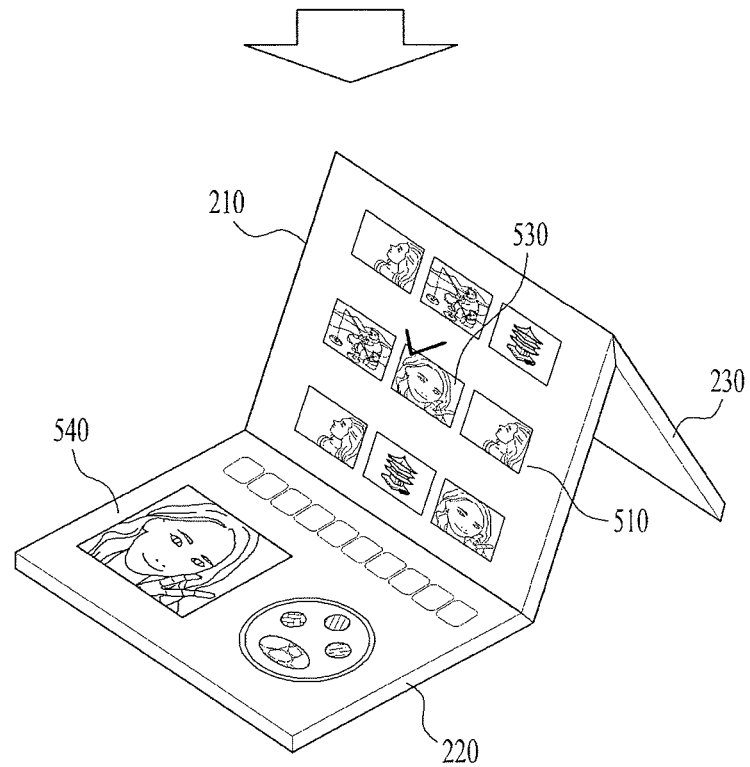

FIGS. 5A and 5B are diagrams of a method for a portable device to control an application based on a control input in a second mode according to one embodiment of the present specification. A portable device 100 may control a first object 530 included in a first application 510 using a second application 520 in a second mode. More specifically, the portable device 100 may control the first object 530 using a control input inputted on the second application 520.

As an example, referring to FIG. 5A, the portable device 100 may execute a gallery application as a first application 510. In this case, the first object 530 may correspond to an image included in the gallery application 510. And, the second application 520 may correspond to an editing application for the first object 530. In this case, the portable device 100 may control the first object 530 using a control input detected on the second application 520. In particular, the portable device 100 may edit the first object 530, which is an image, using the second application 520.

As a different example, referring to FIG. 5B, the portable device 100 may display a third application 540 on the second area in response to a second object 550 included in the first application 510. In this case, the second object 550 corresponds to an image included in the gallery application 510 and the third application 540 may correspond to an editing application 540. In this case, the portable device 100 may control the second object 550 using the third application 540. In particular, the portable device 100 may control a selected object among objects included in the first application 510 using an application displayed on the second area.

Figure 6:
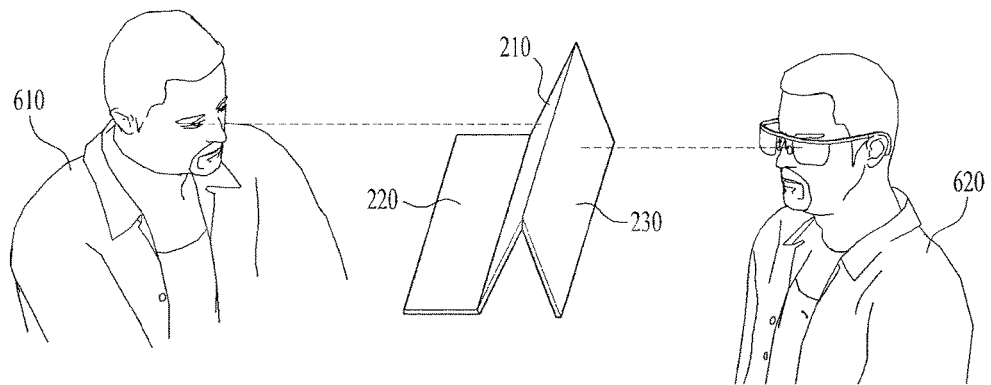
FIG. 6 is a diagram of a method for a portable device to display a plurality of applications according to one embodiment of the present specification.

FIG. 6 is a diagram of a method for a portable device to display a plurality of applications according to one embodiment of the present specification. If a portable device 100 is set to a second mode, the portable device 100 may further display a third application on a third area of a third body 230. More specifically, if the portable device is set to the second mode, the portable device 100 may display a first application on a first area of a first body 210. And, the portable device 100 may display a second application related to the first application on a second area of a second body 220. And, the portable device 100 may display the third application on the third area of the third body 230 irrespective of the first application. In this case, the portable device 100 may be used by a plurality of users 610/620. In this case, a first user 610 may use the first application and the second application displayed on the first area and the second area, respectively. On the contrary, a second user 620 may use the third application displayed on the third area. In this case, as an example, the portable device 100 may detect control inputs of the first user 610 and the second user 620, respectively. In particular, the portable device 100 may separately detect a control input inputted on both the first application and the second application and a control input inputted on the third application. The portable device may respectively control the control inputs. By doing so, the users 610/620 may use the portable device 100 in a manner of sharing the portable device with each other.

Figure 7A:
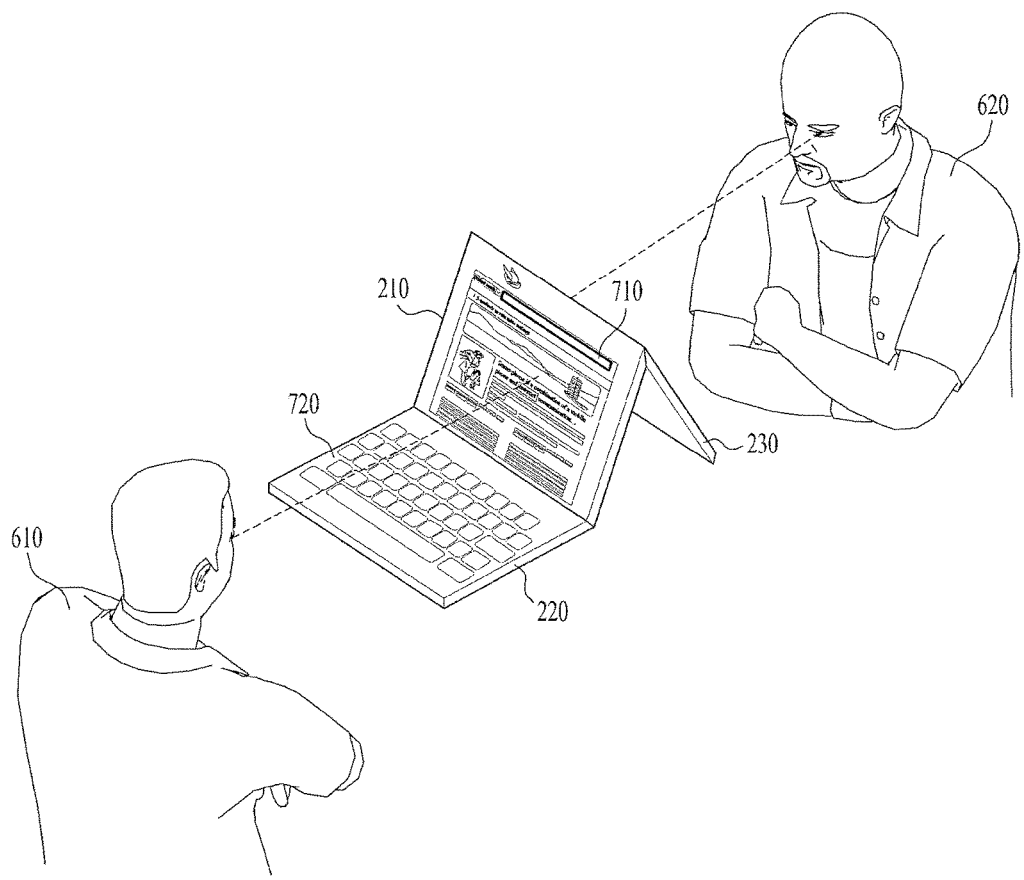
FIGS. 7A and 7B are diagrams of a method for a portable device to display a plurality of applications according to one embodiment of the present specification.
Figure 7B:
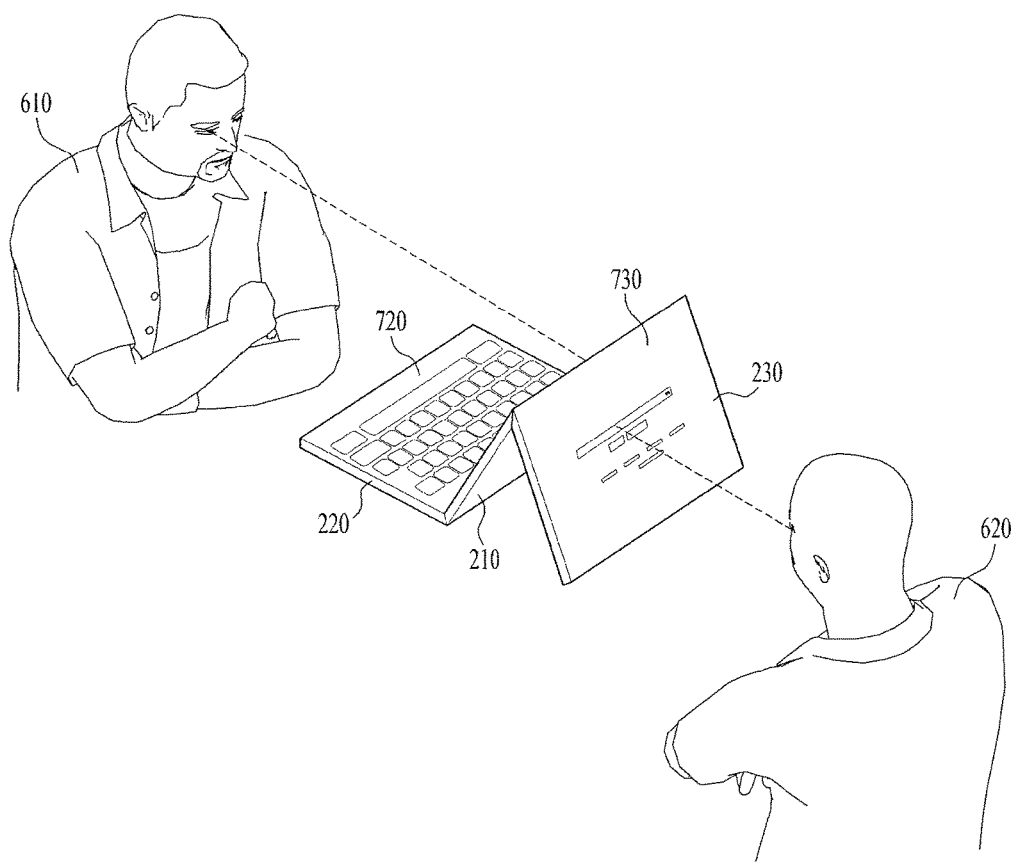

FIGS. 7A and 7B are diagrams of a method for a portable device to display a plurality of applications according to one embodiment of the present specification. A portable device 100 may be shared by a plurality of user 610/620.

As an example, referring to FIG. 7A, the portable device 100 may display a first application 710 on a first area in a second mode. In this case, the first application 710 may correspond to an internet application. And, the portable device 100 may display a second application 720 associated with the first application 710 on a second area. In this case, the second application 720 may correspond to a virtual keyboard application 720. In this case, the portable device 100 may control an object included in the first application using the second application 720.

Referring to FIG. 7B, the portable device 100 may display a third application 730 on a third area in the second mode. In this case, the third application 730 may correspond to an internet application different from the first application 710. In this case, as an example, the third application 730 displayed on the third area of portable device 100 may not be controlled by the second application 720. More specifically, the portable device 100 may detect a separate control input inputted on the third application 730. The portable device 100 may control the third application 730 using the detected control input. In particular, the portable device 100 may separately detect the control input inputted on the third application 730. By doing so, the users 610/620 may use the portable device 100 in a manner of sharing the portable device with each other.

Figure 8:
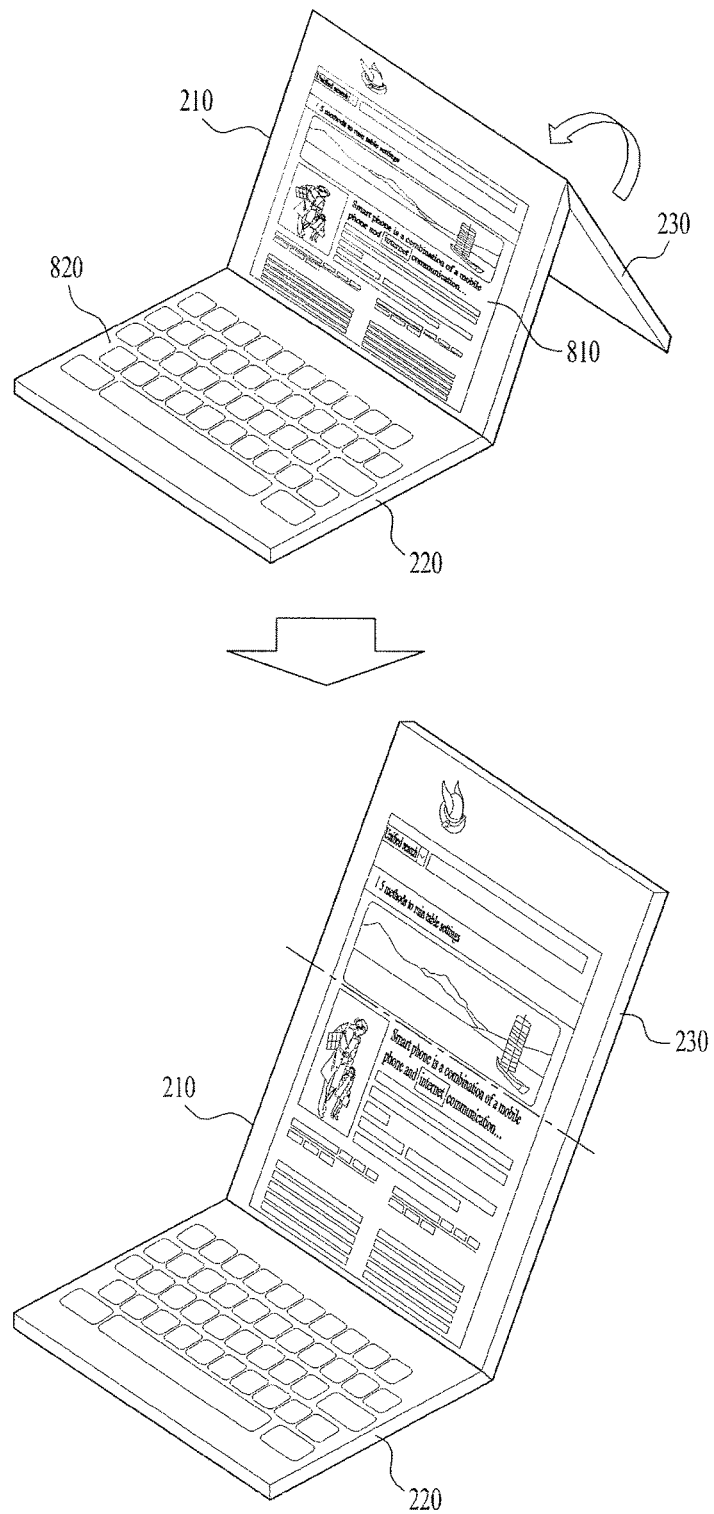
FIG. 8 is a diagram of a method for a portable device to display an application based on a folding angle according to one embodiment of the present specification.

FIG. 8 is a diagram of a method for a portable device to display an application based on a folding angle according to one embodiment of the present specification.

A portable device 100 may display a first application 810 on a first area of a first body 210 in a second mode. And, the portable device 100 may display a second application 820 associated with the first application 810 on a second area of a second body 220. In this case, the portable device 100 may detect change of a folded state of the second body 220 and change of a folded state of a third body 230. More specifically, the portable device 100 may detect change of a first folding angle between the first body 210 and the second body 220 and change of a second folding angle between the first body 210 and the third body 230. In this case, the portable device may detect that the first folding angle maintains a state being equal to or greater than a first threshold angle and less than a second threshold angle. In this case, the portable device 100 may detect that the second folding angle changes to an angle being equal to or greater than a third threshold angle. In this case, as an example, referring to FIG. 8, the first folding angle may correspond to an angle of which the first body 210 and the second body 220 are neither fully folded nor fully unfolded. On the contrary, the second folding angle may correspond to an angle of which the first body 210 and the third body 230 change to an unfolded state. In particular, the portable device 100 may detect that the first body 210 and the second body 220 maintain a prescribed angle and the third body 230 changes to a fully unfolded state. In this case, as an example, the portable device 100 may display the first application 810 used to be displayed on the first area only on the third area as well as the first area in a manner of expanding the first application. In particular, the portable device 100 may display the first application 810 on the first and the third area. By doing so, a user may expand an area on which the first application 810 is displayed by unfolding the third body 230.

Figure 9A:
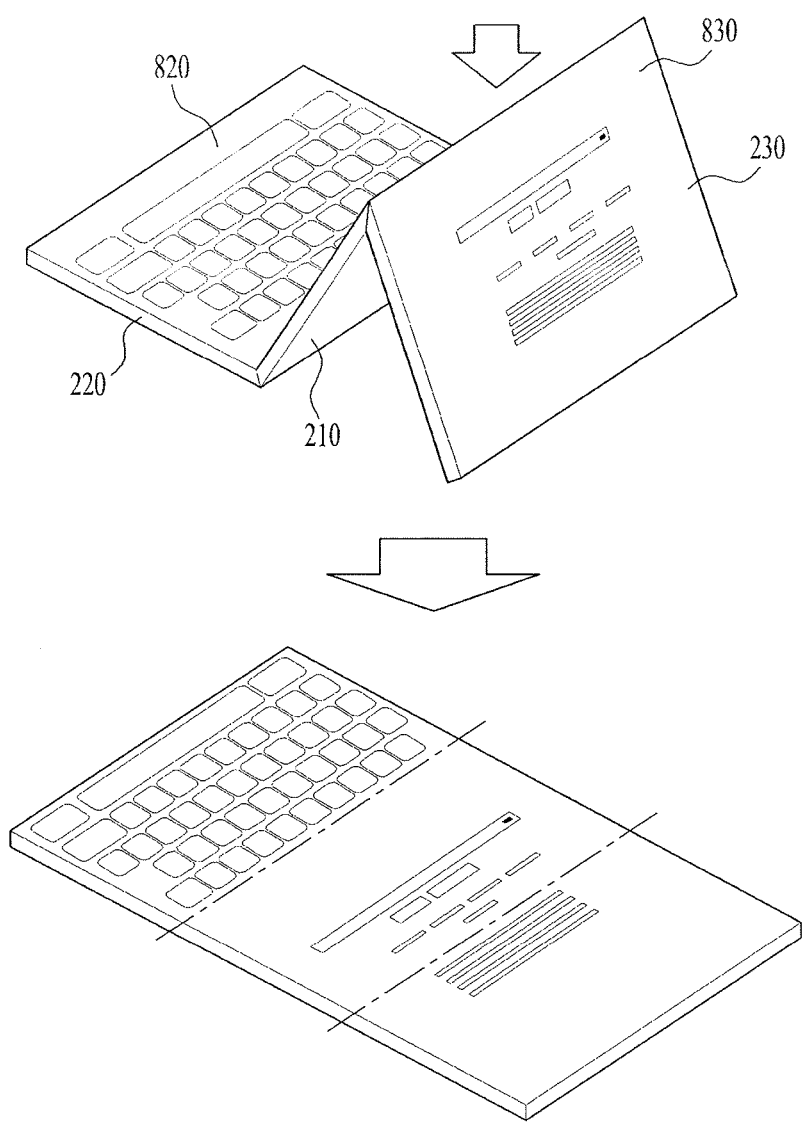
FIGS. 9A and 9B are diagrams of a method for a portable device to display an application based on a folding angle according to one embodiment of the present specification.
Figure 9B:
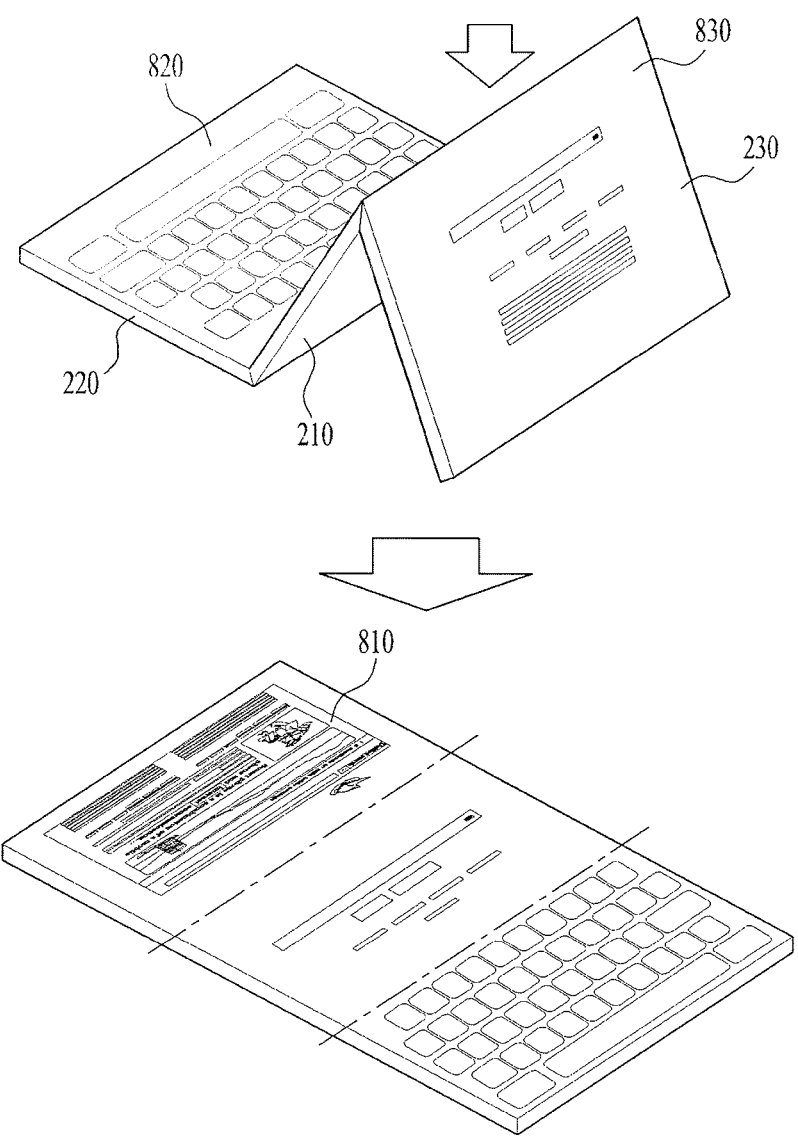

FIGS. 9A and 9B are diagrams of a method for a portable device to display an application based on a folding angle according to one embodiment of the present specification. A portable device 100 may display a first application 810 on a first area of a first body 210 in a second mode. And, the portable device 100 may display a second application 820 associated with the first application 810 on a second area of a second body 220. And, the portable device 100 may further display a third application 830 on a third area of a third body 230. In this case, the third application 830 may correspond to an application independent of the first application. And, as an example, the third application 830 may be displayed in a direction opposite to a direction of the first application 810.

In this case, as an example, referring to FIG. 9A, the portable device may detect change of a folded state of the second body 220 and change of a folded state of the third body 230. More specifically, the portable device 100 may detect that a first folding angle between the first body 210 and the second body 220 changes to an angle being equal to or greater than a first threshold angle in the second mode. And, the portable device 100 may detect that a second folding angle between the first body 210 and the third body 230 changes to an angle being equal to or greater than the first threshold angle. In this case, as an example, the first threshold angle may correspond to a threshold angle configured to detect a fully unfolded second body 220 or a fully unfolded third body 230. In particular, the portable device 100 may detect that the second body 220 and the third body 230 are fully unfolded. In this case, the portable device 100 may display the third application 830 on the first area as well as the third area in a manner of expanding the third application. In particular, the portable device 100 may display the third application 830 on the first area and the third area. In particular, if all of the 3 bodies are unfolded, the portable device 100 may display the third application 830 on the first area and the third area. By doing so, the portable device 100 may display the third application 830 in a manner of expanding the third application.

As a different example, referring to FIG. 9B, the portable device 100 may detect that the second body 220 and the third body 230 are unfolded. In this case, the portable device 100 may display the third application 830 on the first area. And, the portable device 100 may display the second application 820 on the second area. In this case, as an example, the second application 820 may change to an application associated with the third application 830. In particular, the second application 820 may change from an application related to an object of the first application 810 to an application related to an object of the third application 830. And, the portable device 100 may further display the first application 810 on the second area. In this case, as an example, the first application may be displayed in a direction opposite to a direction displayed before unfolding. By doing so, in case that both the second body 220 and the third body 230 are unfolded, a user using the third application 830 may use the expanded area.

As a further different example, in case that the second body 220 and the third body 230 are unfolded, the portable device 100 may display a fourth application (not depicted) associated with the third application 830 on the third area. In this case, the fourth application may correspond to an application related to an object included in the third application 830. In particular, the portable device may control the third application using a control input inputted on the fourth application. In this case, the portable device 100 may display the third application 830 on the second area as well as the first area in a manner of expanding the third application. In particular, in case that the both the second body 220 and the third body 230 are unfolded in the second mode, the portable device 100 displays the third application 830 on the first and the second area and may be able to display the fourth application related to the object included in the third application 830 on the third area.

Figure 10A:
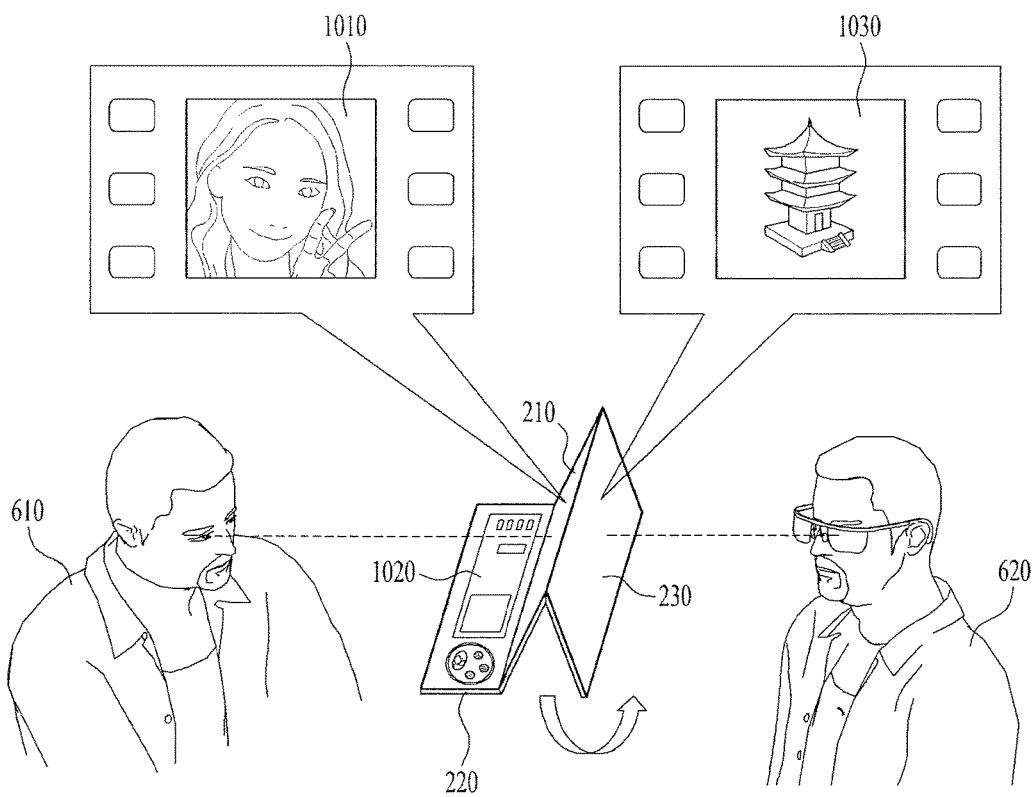
FIGS. 10A and 10B are diagrams of a method for a portable device to display an application based on whether the portable device is rotated according to one embodiment of the present specification.
Figure 10B:
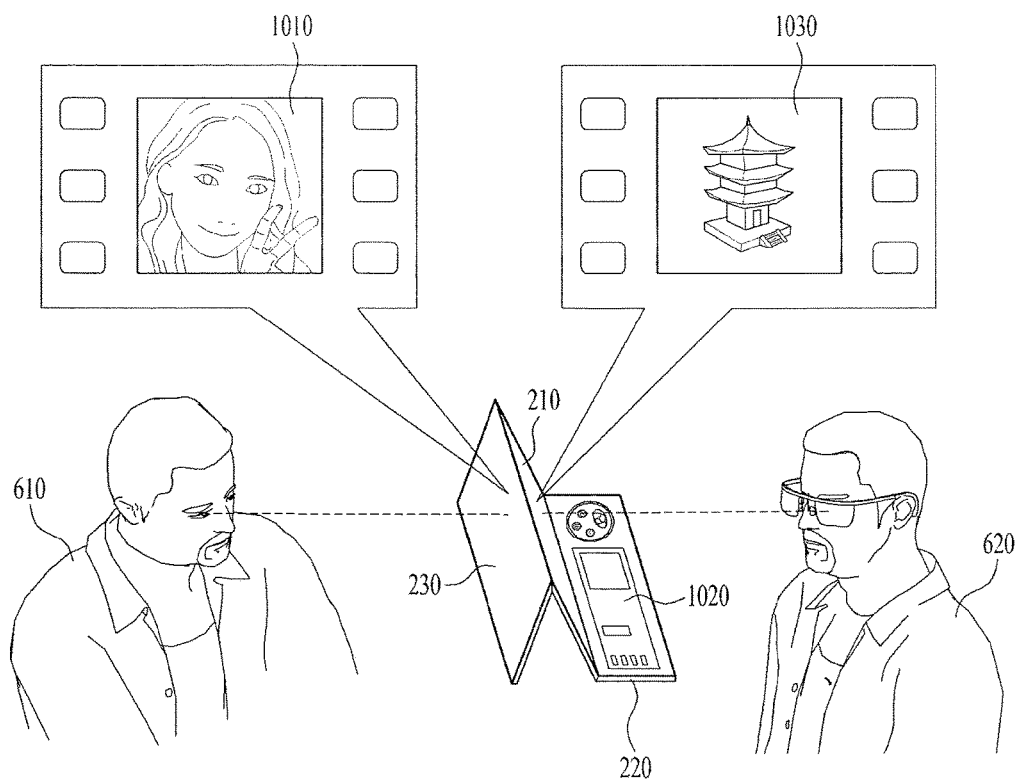

FIGS. 10A and 10B are diagrams of a method for a portable device to display an application based on whether the portable device is rotated according to one embodiment of the present specification. A portable device 100 may detect whether the portable device is rotated using a sensor unit (not depicted). In this case, the sensor unit may detect a rotation of the portable device 100 using a gyro sensor, an acceleration sensor and the like.

In this case, as an example, referring to FIG. 10A, the portable device 100 may display a first application 1010 on a first area of a first body 210. And, the portable device 100 may display a second application 1020 on a second area of a second body 220. In this case, the second application 1020 may correspond to an application associated with the first application 1010. More specifically, the second application 1020 may correspond to an application configured to control the first application 1010 as an advanced application of the first application 1010. In particular, the first application 1010 may be controlled in a manner of being connected with the second application 1020. In this case, a first user 610 may control the first application 1010 using the second application 1020. And, the portable device 100 may display a third application 1030 on a third area of a third body 230. In this case, the third application 130 may correspond to a simple application not connected with the second application 1020. In particular, the third application 1030 may not be controlled by the second application 1020. Hence, a second user 620 may control the third application 1030 using a separate control input.

In this case, referring to FIG. 10B, the portable device 100 may detect that the portable device 100 is rotated more than a predetermined angle using a sensor unit (not depicted). In this case, the predetermined angle may correspond to a threshold angle configured to detect whether the portable device 100 is rotated and may have a prescribed error range. In this case, the portable device 100 may display the first application 1010 on the third area of the third body 230. And, the portable device 100 may display the third application 1030 on the first area of the first body 210. And, the portable device may display the second application on the second area of the second body 220. In this case, the second application 1020 may change to an application associated with the third application 1030.

More specifically, in case that the portable device 100 is rotated more than a predetermined angle, the first application 1010 may change to a simple application not controlled by the second application 1020. In this case, the first application 1010 may be displayed on the third area. In particular, if the portable device 100 rotates, the first user 610 may watch the previously watched first application 1010 via the third area. Yet, in this case, the first user 610 may not be able to control the first application 1010 using the second application 1020.

On the contrary, in case that the portable device 100 rotates more than a predetermined angle, the third application 1030 may change to an application controlled by the second application 1020. In particular, the second application 1020 may become an advanced application of the third application 1030. In this case, the third application 1030 may be displayed on the first area. In particular, if the portable device 100 rotates, the second user 620 may watch the previously watched third application 1030 via the first area. In this case, the second user 620 may control the third application 1030 using the second application 1020 situating at a direction of the second user 620. By doing so, a plurality of the users 610/620 may use the portable device 100 in a manner of sharing the portable device with each other based on a direction of the portable device 100.

Figure 11:
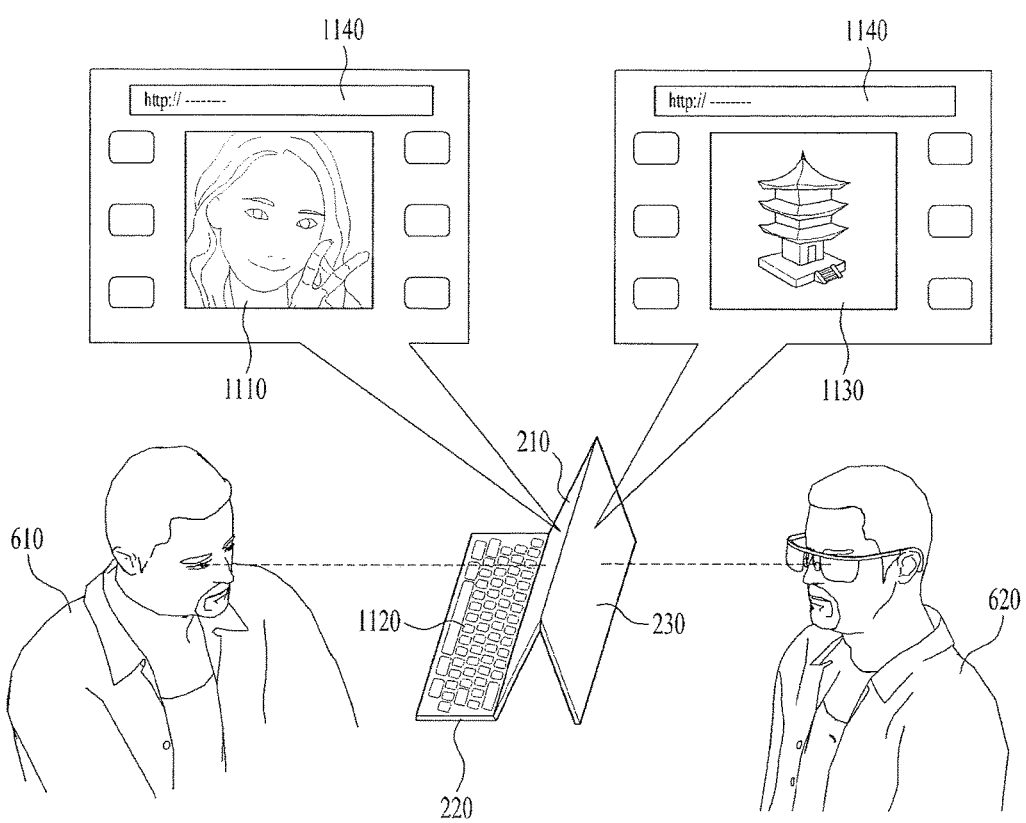
FIG. 11 is a diagram for an object commonly controlled by a portable device according to one embodiment of the present specification.

FIG. 11 is a diagram for an object commonly controlled by a portable device according to one embodiment of the present specification. A portable device 100 may display a first application 1110 on a first area in a second mode. And, the portable device 100 may display a third application 1130 on a third area. In this case, the first application 1110 may be controlled by a second application 1120 displayed on a second area. And, the third application 1130 may not be controlled by the second application 1120. In particular, a first user 610 may control the first application 1110 using the second application 1120. And, a second user 620 may control the third application 1130 using a separate control input.

In this case, as an example, the portable device 100 may further display a first object 1140 on the first area and the third area, respectively. In this case, the first object 1140 may correspond to an icon, an image, an application or the like. In this case, as an example, the first object 1140 may correspond to an object commonly controlled by the second application 1120. In particular, the first object 1140 is displayed on both the first area and the third area and may be commonly controlled by the second application 1120. By doing so, the portable device 100 may display a commonly controlled object on the first area and the third area.

FIG. 12 is a flowchart for a method of controlling a portable device according to one embodiment of the present specification. A portable device 100 may set a first mode based on a first folding angle between a first body and a second body and a second folding angle between the first body and a third body [S 1210]. In this case, as mentioned earlier in FIG. 3, if the first folding angle and the second folding angle are equal to or greater than a first threshold angle, the portable device 100 may set the first mode. In this case, as an example, the first threshold angle may correspond to an angle configured to detect whether the second body and the third body are in an unfolded state. In particular, if both the second body and the third body are unfolded, the portable device 100 may set the first mode. As a different example, if the first folding angle and the second folding angle are less than a second threshold angle, the portable device 100 may set the first mode. In this case, as an example, the second threshold angle may correspond to a threshold angle configured to detect whether the second body and the third body are in a folded state. In particular, if both the second body and the third body are folded, the portable device 100 may set the first mode.

Subsequently, the portable device 100 may detect change of the first folding angle and change of the second folding angle in the first mode [S1220]. In this case, as mentioned earlier in FIG. 1, the portable device 100 may detect the change of the first folding angle and the change of the second folding angle using a first sensor unit 120. In this case, the first sensor unit 120 may detect the change of the first folding angle and the change of the second folding angle based on an internal angle between bodies, a distance between bodies and an operation of a hinge.

Subsequently, the portable device 100 may detect that the first folding angle is equal to or greater than a first threshold angle and the second folding angle is less than a second threshold angle [S1230]. In this case, as mentioned earlier in FIG. 3, the first threshold angle may correspond to an angle between 90 degrees and 180 degrees. And, the second threshold angle may correspond to an angle between 0 degree and 90 degrees. In particular, the first threshold angle and the second threshold angle may correspond to threshold angles configured to determine a folded state of the first body 210, the second body 220 and the third body 230.

Subsequently, the portable device 100 may detect that a rear side of the second body is in a state of being contacted with a different real object [S 1240]. In this case, as mentioned earlier in FIG. 1, the portable device may detect whether the rear side of the second body is in the state of being contacted with the different real object using a second sensor unit 130. In this case, as an example, the second sensor unit 130 may detect the state of being contacted with the different real object using a resistive touch sensor or a capacitive touch sensor. As a different example, the second sensor unit 130 may include at least one selected from the group consisting of an infrared sensor, a proximity sensor, an ultrasonic sensor and an illumination sensor. In this case, the second sensor unit 130 may correspond to a sensor configured to measure distance and may detect whether a rear side of a body is in a state of being contacted with a different real object based on a distance between the real side of the body and the different real object.

Subsequently, the portable device 100 may switch to a second mode [S1250]. In this case, as mentioned earlier in FIG. 3, the portable device 100 may display a first application in the first mode. In this case, if the first mode is switched to the second mode, the portable device may display the first application on a first area. And, the portable device 100 may display a second application related to a first object included in the first application on a second area. In this case, as an example, the first object may correspond to an image, a text, an icon or the like included in the first application. And, the first object may correspond to an area configured by a user or a processor 150.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A portable device 100 according to the present specification and a method of controlling therefor may not limitedly apply to the composition and method of the aforementioned embodiments. The aforementioned embodiments may be configured in a manner of being selectively combined the whole of the embodiments or a part of the embodiments to achieve various modifications.

Meanwhile, a portable device 100 according to the present specification and a method of controlling therefor may be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the internet and the like is also included. And, since the recording media readable by the processor are distributed to the computers connected by a network, codes readable by the processor may be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations may be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on both of the inventions may be complementally applied, if necessary.

What is claimed is:

1. A portable device comprising a first body at the center of the portable device, a second body positioned at one side of the first body and a third body positioned at another side of the first body;
   a display configured to display visual information on at least one of a first area of the first body, a second area of the second body and a third area of the third body;
   a first sensor configured to detect at least one of a first folding angle between the first body and the second body and a second folding angle between the first body and the third body;
   a second sensor configured to detect a contact state that a rear side of the second body is contacted with a different real object;
   a rotation sensor configured to detect a rotation of the portable device; and
   a processor configured to control the display, the first sensor and the second sensor,
   wherein the processor is further configured to:
   set a first mode based on the first folding angle, the second folding angle, and the contact state,
   display a first application on the first area, the second area and the third area in the first mode,
   detect a change of the first folding angle and the second folding angle in the first mode,
   switch the first mode to a second mode when the changed first folding angle is equal to or greater than a first threshold angle, the changed second angle being less than a second threshold angle and the contact state being a state of contact with the different real object,
   display the first application on the first area in the first direction, a second application on the second area in the first direction and a third application on the third area in a second direction, in the second mode,
   wherein the second application is related to a first object contained in the first application on the second area in the first direction, detect the rotation of the portable device in the second mode, and display the first application on the third area in the first direction, the second application on the second area in the second direction and the third application on the first area in the second direction when the portable device is rotated more than a predetermined angle, wherein the predetermined angle is such that the first application being viewed by a user before rotation may continue may be viewed by the user after rotation of the portable device, wherein the second application is related to a second object contained in the third application on the second area in the second direction, and wherein the first direction is an opposite direction to the second direction.

2. The portable device of claim 1, wherein the display is further configured to display the visual information based on one of a portrait mode and a landscape mode, and wherein the processor is further configured to set the second mode when the landscape mode is further detected.

3. The portable device of claim 1, further comprising a control input sensing configured to detect a control input and to deliver the detected control input to the processor.

4. The portable device of claim 3, wherein the processor is further configured to:

display a fourth application related to the first object on the second area when the control input selecting the first object contained in the first application is detected in the second mode.

5. The portable device of claim 3, wherein the processor is further configured to:

detect the control input inputted on the second application, and control the first object or the second object based on the detected control input.

6. The portable device of claim 1, wherein the processor is further configured to:

display the first application on the third area and the first area by expanding the first application when the first folding angle is equal to or greater than the first threshold angle and less than a third threshold angle, and the second folding angle is changed to being equal to or greater than a fourth threshold angle in the second mode.

7. The portable device of claim 1, wherein the processor is further configured to:

display the third application on the first area and the third area by expanding the third application when the first folding angle is changed to being equal to or greater than a third threshold angle, and the second folding angle is changed to being equal to or greater than a fourth threshold angle in the second mode.

8. The portable device of claim 1, wherein the processor is further configured to:

display the third application on the first area and display a fifth application related to the second object contained in the third application on the third area when the first folding angle is changed to being equal to or greater than a third threshold angle, and the second folding angle is changed to being equal to or greater than a fourth threshold angle in the second mode.

9. The portable device of claim 8, wherein the processor is further configured to:

if the fifth application is displayed on the third area, display the third application on the second area and the first area by expanding the third application.

10. The portable device of claim 1, wherein the processor is further configured to:

control the second object based on a control input inputted on the second application.

11. The portable device of claim 5, wherein the processor is further configured to:

if the second mode is set, display a third object on the first area and the third area, respectively.

12. The portable device of claim 11, wherein the third object corresponds to an object commonly controlled based on the control input inputted on the second application.

13. The portable device of claim 1, wherein the processor is further configured to:

set the first mode when the first folding angle and the second folding angle are equal to or greater than a third threshold angle, and wherein the first mode corresponds to a mode configured to display the first application on the first area, the second area and the third area.

14. The portable device of claim 13, wherein the processor is further configured to:

display the first application on the first area by reducing the first application with a predetermined ratio when the first mode is switched to the second mode.

15. The portable device of claim 1, wherein the processor is further configured to:

set the first mode when the first folding angle and the second folding angle are less than a third threshold angle, and wherein the first mode corresponds to a mode configured to display the first application on the third area.

16. The portable device of claim 15, wherein the processor is further configured to:

display the first application on the first area by moving the first application from the third area when the first mode is switched to the second mode.

17. A method of controlling a portable device including a first body at the center of the portable device, a second body positioned at one side of the first body and a third body positioned at another side of the first body, the method comprising:

detecting, via a first sensor, at least one of a first folding angle between the first body and the second body, a second folding angle between the first body and the third body and, via a second sensor, a contact state of a rear side of the second body;

setting, via a processor, a first mode based on the first folding angle, the second folding angle and the contact state;

displaying, via a display, a first application on the first area, the second area and the third area in the first mode;

detecting, via the processor, a change of the first folding angle and the second folding angle in the first mode;

detecting, via the processor, the changed first folding angle being equal to or greater than a first threshold angle, the changed second folding angle being less than a second threshold angle and the contact state being a state of contact with a different real object;

switching, via the processor, the first mode to a second mode;

displaying, via the display, the first application on the first area in a first direction, a second application on the second area in the first direction and a third application on the third area in a second direction, in the second mode, wherein the second application is related to a first object contained in the first application on the second area in the first direction;

detecting, via a rotation sensor, a rotation of the portable device in the second mode; and displaying, via the display, the first application on the third area in the first direction, the second application on the second area in the second direction and the third application on the third area in the second direction when the portable device is rotated more than a predetermined angle, wherein the predetermined angle is such that the first application being viewed by a user before rotation may continue to be viewed by the user after rotation of the portable device, wherein the second application is related to a second object contained in the third application on the second area in the second direction, and wherein the first direction is an opposite direction to the second direction.

18. The portable device of claim 1, wherein the rotation sensor is further configured to detect a horizontal rotation of the portable device, and wherein the processor is further configured to detect the horizontal rotation of the portable device.

* * * * *